United States Patent
Akenine-Möller et al.

(10) Patent No.: US 7,495,672 B2
(45) Date of Patent: Feb. 24, 2009

(54) LOW-COST SUPERSAMPLING RASTERIZATION

(75) Inventors: Tomas Akenine-Möller, Lund (SE); Fredrik Tolf, Malmö (SE); Martin Levin, Malmö (SE); Erik Ledfelt, Vellinge (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 10/539,813

(22) PCT Filed: Nov. 25, 2003

(86) PCT No.: PCT/EP03/13227

§ 371 (c)(1), (2), (4) Date: Oct. 27, 2005

(87) PCT Pub. No.: WO2004/057538

PCT Pub. Date: Jul. 8, 2004

(65) Prior Publication Data

US 2006/0061590 A1  Mar. 23, 2006

Related U.S. Application Data

(60) Provisional application No. 60/436,162, filed on Dec. 23, 2002.

(30) Foreign Application Priority Data

Dec. 20, 2002  (EP)  ..................... 02028537

(51) Int. Cl.
G09G 5/00 (2006.01)
(52) U.S. Cl. ............. 345/611; 345/613; 382/269
(58) Field of Classification Search ............... None
See application file for complete search history.

(56) References Cited

U.S. PATENT DOCUMENTS

| 6,057,855 | A | 5/2000 | Barkans |
| 6,636,218 | B1* | 10/2003 | Nelson ................. 345/441 |
| 6,731,300 | B2* | 5/2004 | Ramani et al. .......... 345/611 |
| 6,999,100 | B1* | 2/2006 | Leather et al. .......... 345/611 |
| 2002/0140706 | A1 | 10/2002 | Peterson et al. |

FOREIGN PATENT DOCUMENTS

| EP | 0 463 700 A2 | 1/1992 |
| WO | WO 00/33256 | 6/2000 |

OTHER PUBLICATIONS

International Search Report of PCT/EP03/013227, mailed Mar. 15, 2004.
International Preliminary Examination Report of PCT/EP03/013227, mailed Mar. 31, 2005.
"HRAA: High-resolution Antialiasing through Multisampling," Technical Brief-NVIDIA Corp., pp. 1-8, 2002, XP002246880, www.nvidia.com
Akenine-Möller, T., "Flipquad: Low-Cost Multisampling Rasterization," Chalmers University of Technology, Technical Report 02-04, pp. 1-4, published Jun. 2003.

* cited by examiner

*Primary Examiner*—Kee M. Tung
*Assistant Examiner*—Kevin K Xu
(74) *Attorney, Agent, or Firm*—Potomac Patent Group PLLC (57) ABSTRACT

A sampling pattern covering an array of pixels for use in an anti-aliasing system is disclosed where each pixel has a pattern of sample points at the edges of the pixel. Moreover is the sample point pattern of each pixel a mirror image and different from the pattern of a directly neighboring pixel.

23 Claims, 7 Drawing Sheets

Fig 1

Quad A

303 = (x0+2/3, y0+1)

304 = (x0, y0+2/3)

305 = (x0+1/3, y0)

306 = (x0+1, y0+1/3)

Quad B

LOW-COST SUPERSAMPLING RASTERIZATION

TECHNICAL FIELD

Generally, the present invention relates to graphic processing and more specifically to a method and apparatus for producing high-quality anti-aliased graphic pictures at high frame rates with low computational cost.

DESCRIPTION OF THE PRIOR ART

Since the early days of computer graphics, aliasing has been a problem when presenting still or moving pictures on a display.

One approach to combat the low visual quality of aliased pictures is to use what is known as supersampling. Supersampling will provide a good picture quality but has the drawback of a low frame rate due to a heavy computational burden. More specifically, supersampling renders a picture at a higher resolution than the final resolution that is displayed on the screen. This is done by rendering multiple sub-pixel samples for each pixel to be displayed, i.e. the value of each pixel will be a weighted sum of the sub-pixel sample values. For example may each displayed pixel comprise the filtered, weighted sum of a group of four sub-pixel samples inside a pixel. As can be readily understood, this implies that the graphics hardware has to process four times as many samples for each displayed pixel.

The patent document WO-00/33256 discloses a system that utilizes a supersampling scheme. Each pixel is divided into a more or less fine-meshed grid which defines a sub-pixel grid, where sample points may be located. The sub-pixel sample points may be arranged in many different configurations inside the pixel boundaries. The sample point configuration pattern is then repeated for every pixel to be rendered. The final value for each pixel comprises the weighted sum of three or more samples located in sub-pixels according to the discussion above.

The patent document U.S. Pat. No. 6,057,855 discloses a system for determining a value for an anti-aliased pixel. In similarity to the above document, the system uses a supersampling scheme for determining the sample values at multiple sub-pixel sample locations.

In order to lower the computational burden for producing anti-aliased pixels, a modified supersampling scheme may be used. The key idea of this supersampling scheme is to place the sub-pixel sample locations in such positions so that the value of one or more of the sample locations may be used for calculating the final value for more than one pixel. A supersampling scheme of this kind is also referred to as a sample-sharing scheme.

The GeForce3 graphics processing unit from NVIDIA Corporation, Santa Clara, USA provides hardware that supports supersampling and sharing of sub samples between pixels. The supersampling scheme is referred to as "Quincunx" and presents a sub-pixel sample pattern in form of a "5" on a die, i.e. five sub-pixel samples are used for calculating the value of the final pixel. However, due to the placing of the sample locations, only two samples per pixel need to be calculated; the rest of the sample values are obtained from the neighboring pixels. The center sub-pixel sample is given the weight 0.5 while the peripheral sub-pixel samples are given the weight 0.125 each. In a subsequent step, the sub-pixel samples are filtered in the same way as with an ordinary supersampling scheme.

Detailed information regarding the Quincunx scheme is found in "Technical Brief, HRAA: High-Resolution Anti-aliasing through Multisampling" from NVIDIA Corporation. This document is e.g. retrievable from the NVIDIA Corporation web site "www.nvidia.com".

The number of gray levels between black and white (in a monochrome scheme) depends on how many sub-pixel sample points that are used. In case four sub-pixel sample locations are used, there will at best be three gray shades between black and white. Consequently, the Quincunx scheme above will at best provide four shades of gray. However, as will be discussed below, the effective number of gray shades for the Quincunx scheme may be as low as two.

Accordingly, the computational burden for producing anti-aliased pixels is a problem in modern computer graphics systems. As is easily understood, the problem becomes even bigger if an anti-aliasing scheme is to be used for producing moving pictures on a device with reduced computational capability, such as a mobile telephone or a PDA (personal digital assistant).

SUMMARY OF THE INVENTION

The present invention seeks to provide a method and apparatus for producing high-quality anti-aliased pictures at a low computational cost.

This object has been achieved by a sampling pattern covering an array of pixels, where each pixel has a pattern of sample points at the edges of the pixel, and where the sample point pattern of each pixel is a mirror image and different from the pattern of a directly neighboring pixel.

BRIEF DESCRIPTION OF THE DRAWINGS

A preferred embodiment of the present invention will now be described with reference to the accompanying drawings, in which.

DETAILED DISCLOSURE OF A PREFERRED EMBODIMENT

Figure 1:
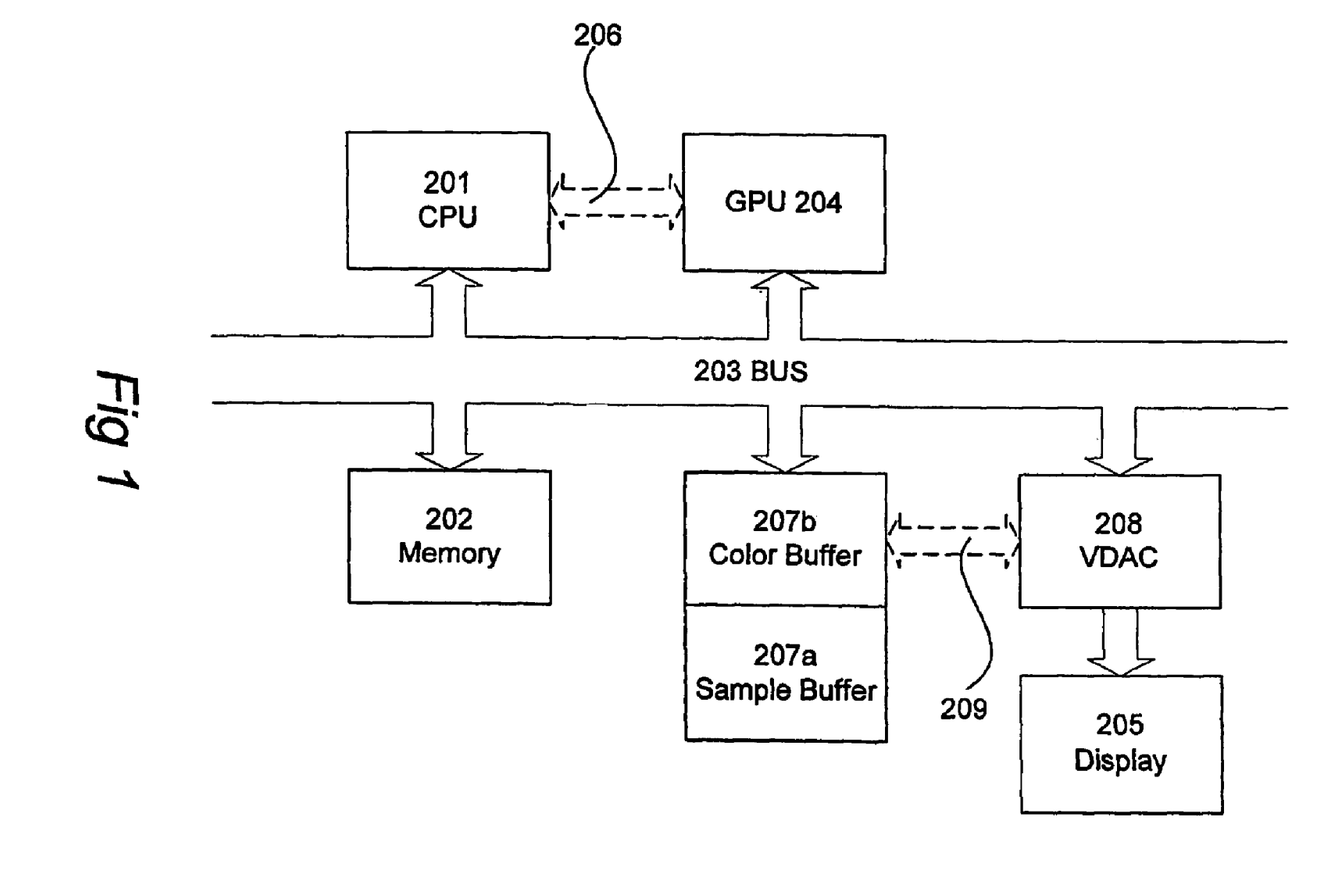
FIG. 1 is a schematic block diagram illustrating a graphics system for creating anti-aliased pictures.

FIG. 1 is a block diagram of an example of a system for drawing lines or polygons. A CPU (Central Processing Unit) 201 is connected to a memory 202 by means of a data bus 203. The memory 202 comprises the application program that is run on the system, e.g. a computer game or a CAD (Computer Aided Design) program. As with most computer systems, the CPU 201 fetches instructions in the memory 202 and executes them in order to perform specific tasks. In this context, a task for the CPU 201 is to provide a GPU 204 (Graphics Processing Unit) with information regarding the objects that shall be drawn on a display 205. It is emphasized that the GPU 204 may be in form of a processor, such as a DSP (Digital Signal Processor), or in form of an ASIC (Application Specific Integrated Circuit), FGPA (Field-Programmable Gate Array), hard-wired logic etc, or it may be executed on the CPU 201. The GPU 204 is also connected to the bus 203 but may as well be connected to the processor by means of a separate high-speed bus 206 in case a lot of information is to be transferred between the CPU 201 and the GPU 204. The data transfers on the separate high-speed bus 206 will then not interfere with the data traffic on the ordinary bus 203.

Moreover, a display memory 207 is also connected to the bus 203 and stores information sent from the GPU 204 regarding the pictures (frames) that shall be drawn on the display 205. More specifically, the display memory contains a sample buffer 207*a* and a color buffer 207*b*. As will be discussed below, according to the present invention, the sample buffer 207*a* contains approximately twice as many samples as there are pixels in the final color buffer 207*b*. The color buffer 207*b* holds the colors of the pixels to be displayed on screen after the rendering of an image is complete. As with the interconnection between the CPU 201 and the GPU 204, the display memory-207 may be connected directly to the GPU 204 by means of a separate, high-speed bus. Since the GPU 204 and the display memory 207 normally are used for producing moving images, it is preferred that the link between these two units is as fast as possible and does not block the normal traffic on the bus 203.

The display memory 207 is connected to a VDAC 208 (Video Digital to Analog Converter), either by means of the shared bus 203 or by a separate high-speed bus 209, which reads the information from the color buffer 207*b* and converts it to an analog signal, e.g. a RGB (Red, Green, Blue) composite signal, that is provided to the display 205 in order to draw the individual-pixels on the screen.

Figure 2A:
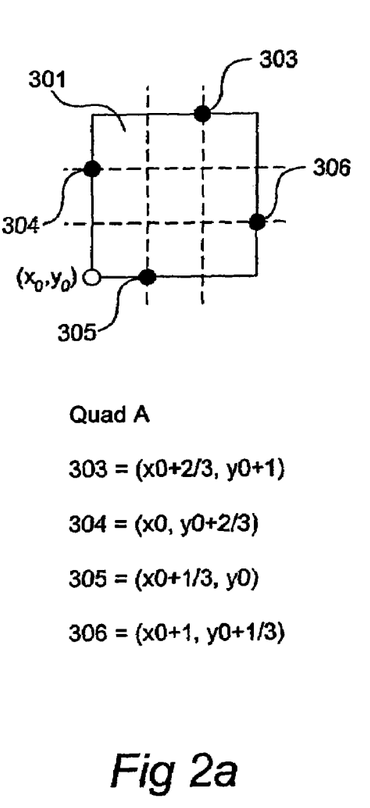
FIG. 2 is a schematic drawing illustrating the calculation of the sub-pixel sample locations according to the present invention.
Figure 2B:
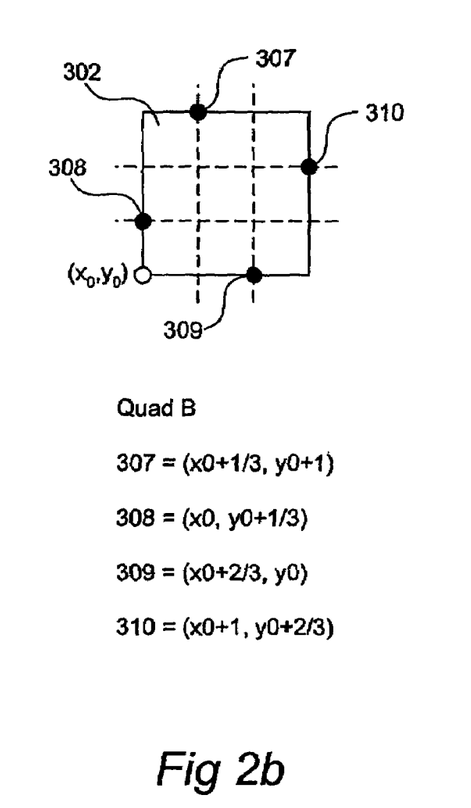

As discussed above, many different techniques have been used in order to produce anti-aliased representations of lines and polygons. As can be seen in FIGS. 2*a* and 2*b*, the present invention uses a variant of a super-sampling scheme. As with the Quincunx scheme, the sub-pixel sample locations 303-306 are placed at the edges of the pixel 301, 302. As discussed above, this allows for sample sharing between different pixels 301, 302 in the display memory 207.

However, the samples are not placed in the corners of the pixel 301, 302 as with the Quincunx scheme. Instead, in a preferred embodiment, one sub-pixel sample location is defined for each edge of the pixel 301, 302 in a rotated square-shaped configuration and is given a weight of 0.25 each. This is explained in FIGS. 2*a* and 2*b* by superimposing a grid over the pixel 301, 302 and defining a possible sample point wherever the grid intersects an edge of a pixel 301, 302. The equations for determining the precise sub-pixel sample locations are shown under FIGS. 2*a* and 2*b* respectively. Alternatively, the edges of the pixels in the discussion above may be substituted by one or more mirroring planes in case the sampling pattern is translated in any direction. The mirror planes will then normally be parallel with the edges of the pixels and with spacing equal to the distance between the edges of the pixels. For example, the sampling pattern may be translated a small amount to the left, wherein the sub-pixel sample locations no longer resides on the edges of the pixels. In this case it is still possible to define one or more mirroring planes for creating a sample pattern according to the present invention. This will become apparent by the discussion below in relation to FIG. 3.

The placing of the sample locations 303-310 will break the symmetry of the configuration which will increase the anti-aliasing effect of near to vertical lines and near to horizontal lines. To illustrate this, lets assume a near to horizontal edge of a polygon that is drawn on a display across one or more pixels 301, 302. If e.g. the Quincunx scheme is used for producing an anti-aliased representation of the line, four sample points, one in each corner of the pixel 301, 302, will be used. For some pixels 301, 302, the edge will cover only the top part but will still cover the two uppermost sub-pixel sample locations. Consequently, by examining the values from the sub-pixel sample locations in the pixel 301, 302, the anti-aliased value of the pixel will be 0.25 even if half the pixel is covered by the edge (i.e. until the live covers the sub-pixel sample in the center). The pixel will hence be incorrectly presented on the screen.

If the same situation applies with the use of the present invention a near to horizontal line, covering a small part of the top of the pixel 301, 302, will not cover both sub-pixel sample locations but only the sample location on the uppermost horizontal edge of the pixel 301, 302 due to the placing of the sample locations. The reason for mirroring-the sample locations for every other pixel will be discussed below.

Figure 3:
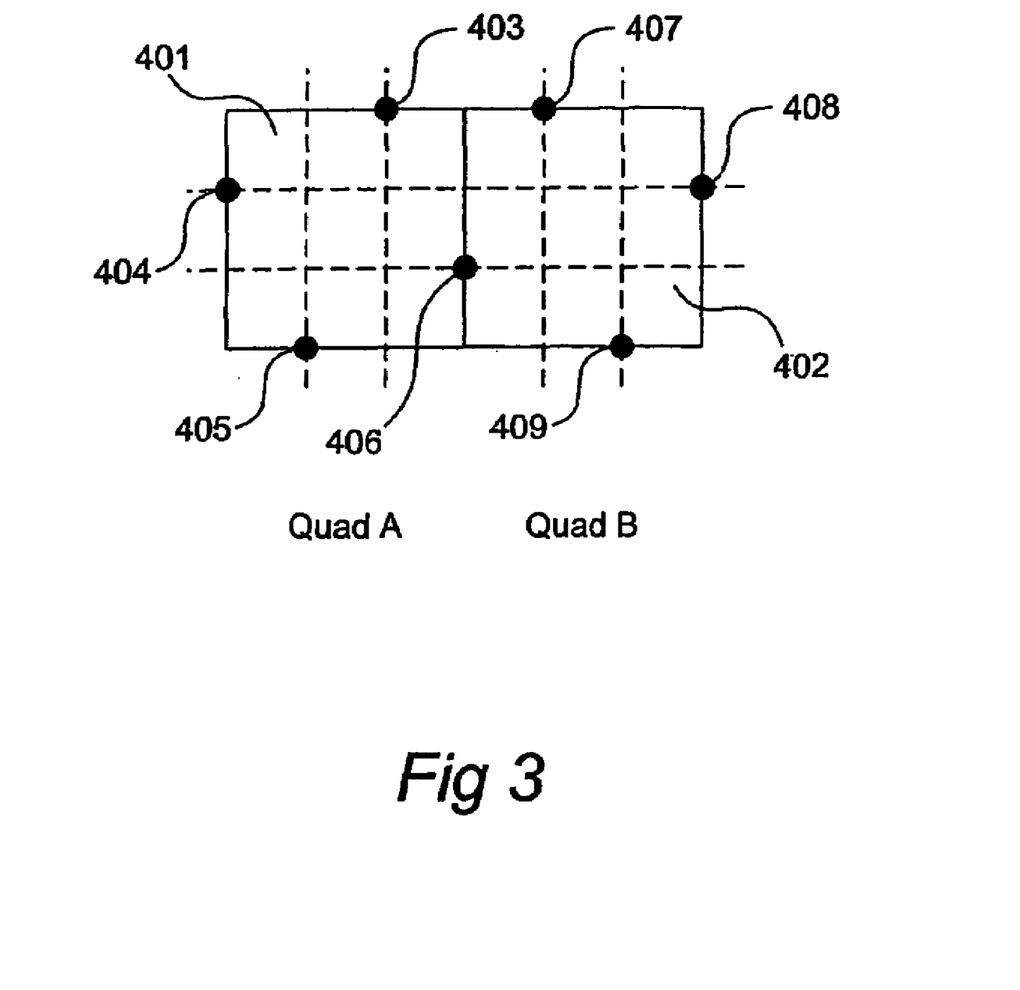
FIG. 3 is a schematic illustration of a mirroring step according to a preferred embodiment of the present invention.

FIG. 3 illustrates an important feature of the present invention. In accordance with the above, the sub-pixel sample locations 403-406 of the leftmost pixel 401 are not placed in the corners of the pixel as is the case with the Quincunx scheme. In the following text, this sub-pixel sample configuration will be referred to as "quad A". Correspondingly, a pixel 402 presenting a sub-pixel sample configuration that is a mirror image of "quad A" will be referred to as "quad B". As can be seen in FIG. 3, the sub-pixel sample locations 406-409 in the rightmost pixel 402 corresponds to the quad B locations according to the above. As mentioned above, by examining the configurations of quad A and quad B side-by-side it is evident that the sub-pixel sample locations 406-409 of quad B is a mirror image of the corresponding locations 403-406 in quad A reflected at the right vertical edge 410 of quad A (and consequently the left vertical edge of quad B).

By mirroring the locations of the sub-pixel sample locations 403-409 it is possible to share the sample 406 between the two pixels and still break up the symmetry of the configuration and achieve a better anti-aliasing result according to the above. Another important feature is that there is only one sample per row and column. In e.g. Quincunx, there are two samples for the top row.

Figure 4:
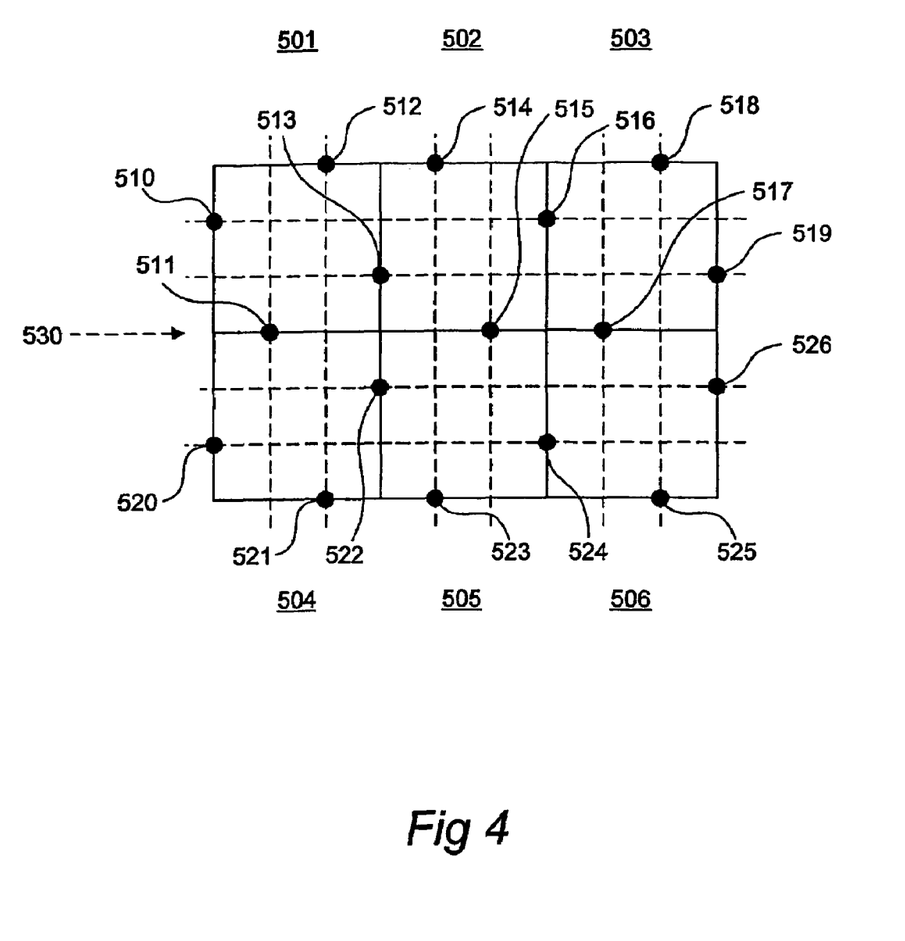
FIG. 4 is another schematic illustration of a mirroring step according to a preferred embodiment of the present invention

FIG. 4 further illustrates the anti-aliasing scheme according to the present invention. The upper left pixel 501 contains four sub-pixel sample points 510-513 in a quad A configuration. The pixel 502 to the right of this pixel 501 also contains-four sub-pixel sample locations 513-516 in a quad B configuration, which are reflected at the right edge of the leftmost pixel 501. Moreover, a third pixel 503 also contains four sub-pixel sample points 516-519 in a quad A configuration. As can be seen from FIG. 4, the upper row of pixels 501-503 share one sub-pixel sample location 513, 516 between each pair of pixels 501-502, 502-503.

Next row starts with a pixel 504 presenting a quad B configuration of sub-pixel sample points 511, 520-522. The sample location 511 is shared between this pixel 504 and the pixel 501 on the row above. By examining the configurations of quad A (the topmost pixel 501) and quad B (the lower pixel 504) side-by-side it is evident that the sub-pixel sample locations 511, 520-522 of quad B is a mirror image of the corresponding locations 510-513 in quad A reflected at the bottom horizontal edge 530 of pixel 501 (and consequently the top horizontal edge of pixel 504).

The next pixel 505 on the second row contains four sub-pixel sample points 515, 522-524 in a quad A configuration. What is important to notice is that this pixel 505 share one sample point 515 with the pixel 502 on the row above and one sample point 522 with the pixel 504 to the left. The same applies to the rightmost pixel 506 on the second row, which also shares two sample points 517, 524 with the neighboring pixels 503, 505.

Consequently, by using the mirroring scheme of the present invention, all pixels, except for the uppermost and leftmost pixels 501-504 on a display 205, require a calculation of only two new sub-pixel sample location values when determining the final value of the pixels 501-506. Alternatively, all pixels except the rightmost column and the bottommost row require only two samples.

The sample locations in the pixels may be traversed by scanning the lines from left to right. Alternatively, the scanning direction may be altered every other line in order to render the memory usage more effective. It is understood that any traversal scheme can be implemented in conjunction with the supersampling scheme according to the present invention.

Figure 5A:
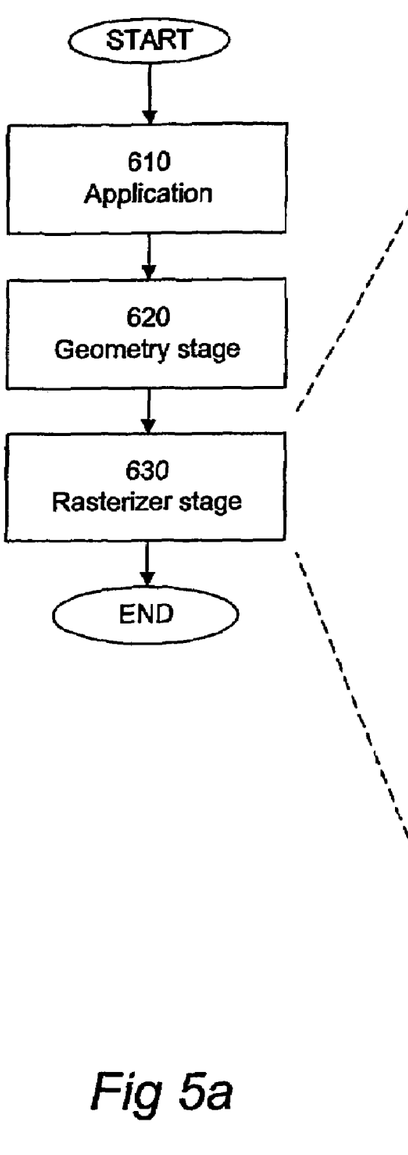
FIG. 5 is a schematic flow chart illustrating the method for producing anti-aliased pictures according to the present invention.

FIG. 5*a* is a flow chart illustrating a method for producing high-quality anti-aliased pictures according to a preferred embodiment of the present invention. In step 610 the CPU runs the application program (e.g. a computer game) and generates the 3D objects (normally polygons in form of triangles) that shall be converted into a 2D-presentation on the display.

Next, in step 620, the CPU or the GPU/hardware calculates the different visual effects that affect the appearance of the object on the display, such as lighting, clipping, transformations, projections, etc. As triangles are normally used when creating 3-D objects in computer graphics, the pixel coordinates of the vertices of the triangles are finally calculated.

In step 630 the CPU or the GPU/hardware interpolates texture coordinates over the polygon in order to ensure that a correct projection is obtained. In addition to this the CPU or GPU/hardware may also interpolate one or more colors, another set of texture coordinates, fog, and more. It also performs Z-buffer tests, and ensures that the final pixel obtains the correct color.

Figure 5B:
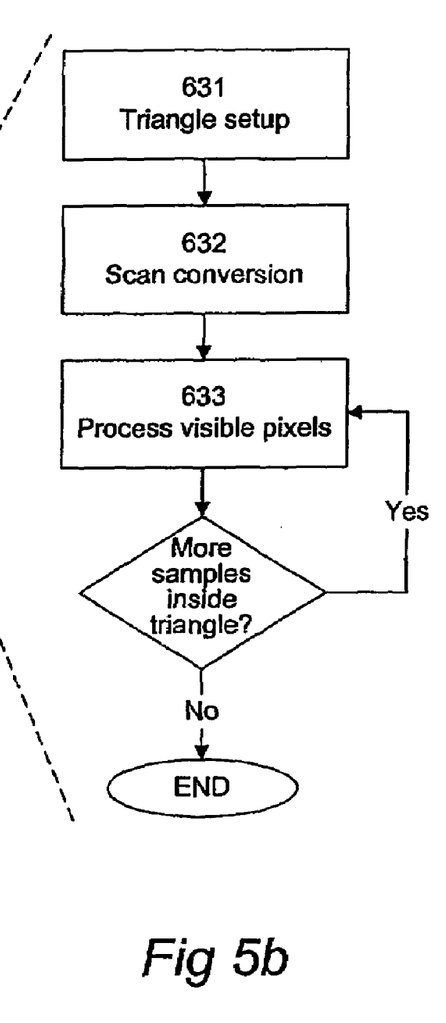

FIG. 5*b* is a more detailed flow chart illustrating step 630 in FIG. 5*a*. To increase the intelligibility of the flow chart in FIG. 5*b*, references are also made to FIG. 6*a*. Step 631 is a polygon (triangle) setup stage where the CPU or-the GPU/hardware calculates interpolation data that is used over the entire polygon 801.

A scan conversion is performed in step 632, wherein the CPU or the GPU/hardware identifies pixels 703 or sample points 704 that lie inside the boundaries 705 of the polygon 701. There are many different ways to perform this identification. A simple approach is to scan the horizontal rows one by one.

All visible sample points 704 are transferred to step 633 which calculates the color of each visible pixel 701 by means of the textures and the interpolated color(s). The color of each sample is written to the sample buffer 207*a*. After all polygons have been processed, the sample buffer 207*a* will contain the picture in a high-resolution format (2 samples pixel of the final image). Only visible samples are processed in this stage. Samples that are not visible, i.e. samples that are behind a previously drawn polygon, will not contribute to the final picture. In a final stage, the samples are filtered to produce a picture of correct size. More specifically, four samples per pixel will be averaged to form the final pixel color stored in the color buffer 207*b*.

Figure 6A:
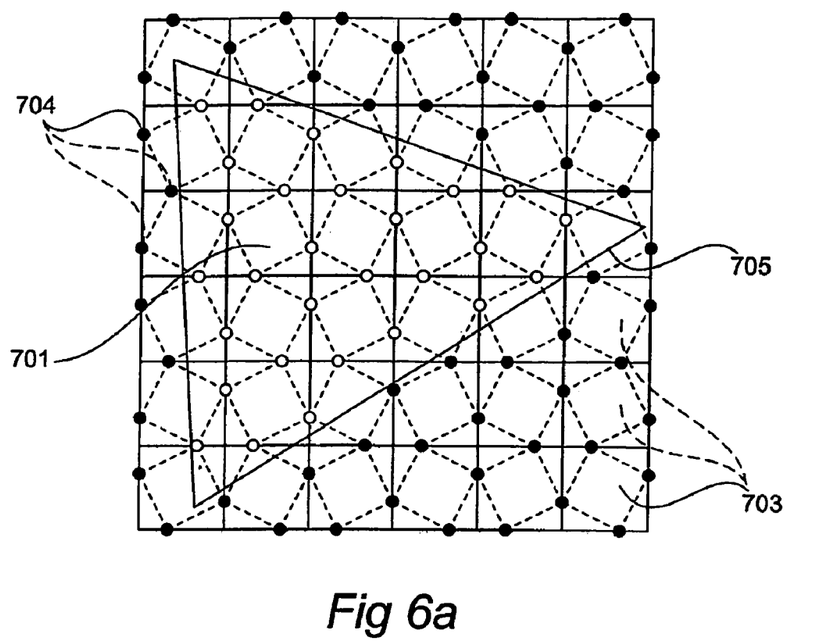
FIG. 6 is a schematic drawing illustrating the calculation of pixel values according to the present invention compared to a prior art scheme.
Figure 6B:
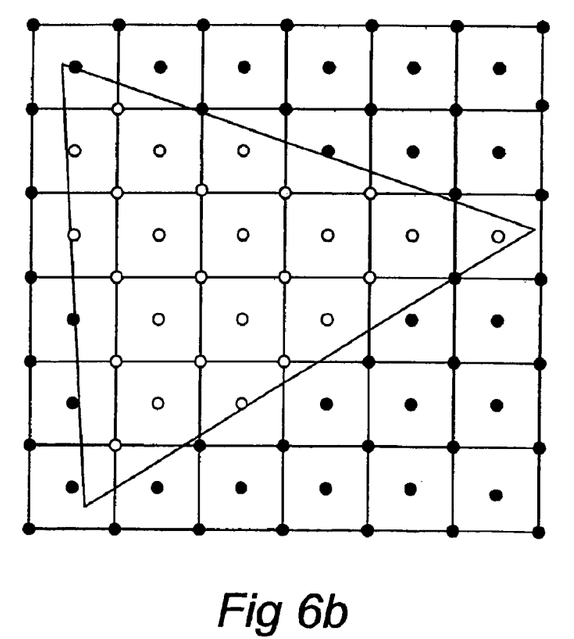

With reference to FIGS. 6*a* and 6*b*, a comparison will now be made between the Quincunx scheme and the scheme according to the present invention. The sub-pixel sampling pattern according to the present invention is illustrated in FIG. 6*a*, and the sub-pixel sampling pattern according to the Quincunx scheme is illustrated in FIG. 6*b*.

Assume that the inside of a triangle is colored white (encoded as 1.0), and the outside colored black (encoded as 0.0). Anything in between 0.0 and 1.0 represents a gray scale. Also, it should be noted that the same applies as well to colors or any other representation. As can be seen from the figures of this example, a polygon, in this case a triangle, is covering a 6×6 pixel matrix. However, the number of pixels are not restricted to this number and depends on the specific application, i.e. a desktop computer system will use a higher resolution (more pixels) than e.g. a mobile telephone. The same working principle applies to any system irrespective of the resolution of the system. In both FIGS. 6*a* and 6*b*, pixels that are completely inside the triangle will obtain the value 1 (completely white). In the Quincunx scheme, this arises from the summing-up of the corner samples (each with the weight 0.125) and the center sample (with weight 0.5). Correspondingly, in the scheme according to the present invention, the same value arises from the summing-up of the four edge sampling positions (each-with the weight 0.25).

In FIG. 6*a*, the leftmost column will obtain the values (from top to bottom): 0.25, 0.5, 0.5, 0.5, 0.5, and 0.25, where each number represents a gray scale color. That is, the vertices of the triangle will have a slightly darker shade of gray than the central part of the left edge of the-triangle.

Correspondingly, in FIG. 6*b*, the leftmost column will obtain the values: 0.125, 0.75, 0.75, 0,25, 0.25, and 0.125. What is important is the abrupt jump between the third and fourth pixel in the column. As mentioned above, the calculated pixel values for a near to vertical line will always make an abrupt jump from 0.25 to 0.75 when the Quincunx scheme is used, even though it is theoretically possible to obtain a value of 0.375, 0.5, and 0.625. On the other hand, the mirroring scheme according to the present invention will give a smoother transition between the different possible pixel values.

Aliasing is very noticeable when drawing almost vertical lines and almost horizontal lines, and thus it is important that the anti-aliasing scheme produces good result when edges are near to vertical or near to horizontal.

Figure 7A:
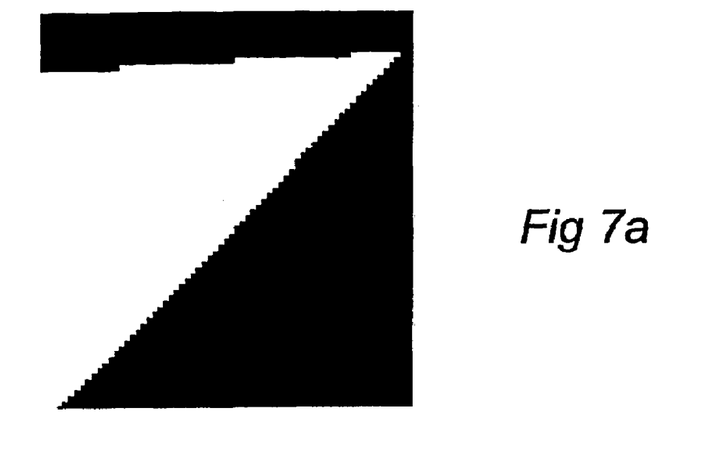
FIG. 7 is a graphic comparison between no anti-aliasing, a prior art scheme and the anti-aliasing scheme according to the present invention.
Figure 7B:
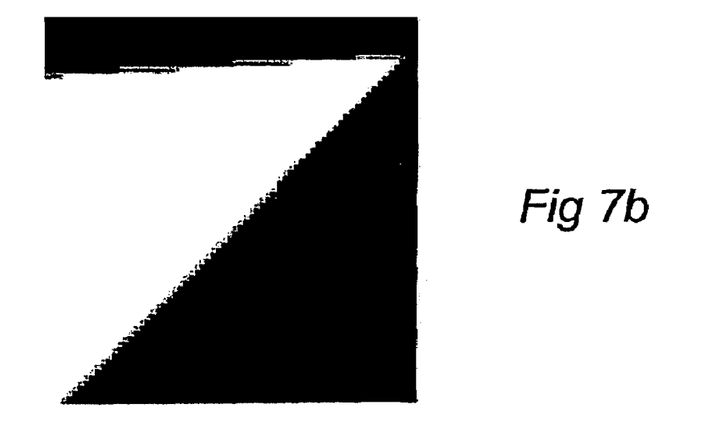
Figure 7C:
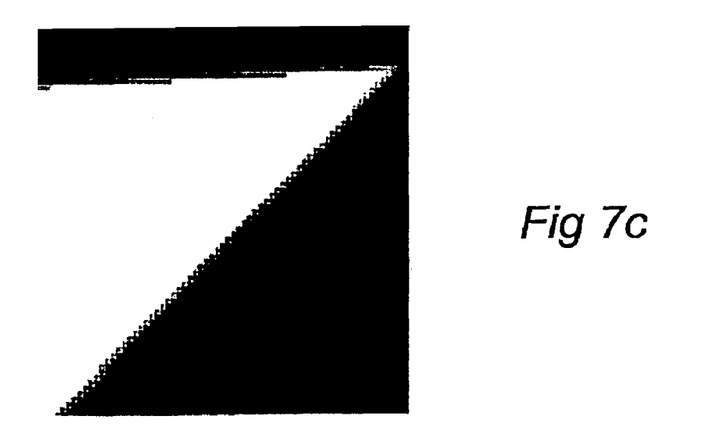

The above reasoning is further illustrated in FIGS. 7*a-c*, where a comparison between no anti-aliasing 7*a*, the Quincunx scheme 7*b*, and the scheme according to the present invention 7*c* is shown. The figures clearly illustrates that the anti-aliasing effect for both for a near to vertical as well as for a diagonal line is enhanced by the scheme according to the present invention. More specifically, the effective number of gray levels presented by the Quincunx scheme is reduced to two as described above while the scheme according to the present invention presents three levels of gray between black and white.

The present invention has been described above with reference to a preferred embodiment. However, other embodiments than the one disclosed herein are possible within the scope of the invention, as defined by the appended independent claims. Exemplary embodiments can, for example, be implemented as computer programs stored on computer-readable mediums.

The invention claimed is:

1. A system for generating anti-aliased images, comprising:
    a processor configured to generate a sampling pattern covering an array of pixels for use in the anti-aliasing system, where each pixel has a pattern of sample points at a mirror plane within the array of pixels, wherein the sample point pattern of each pixel is a mirror image of a directly neighboring pixel, mirrored in a mirror plane, and different from the pattern of said directly neighboring pixel, wherein the mirror planes are located on the edges of the pixel, and the pattern has one sample point per pixel mirror plane, and wherein pixel values derived from said sample points are displayed on a screen.

2. The system according to claim 1, wherein the (x, y) coordinates of the sample points for a pixel are related according to (0, a), (a, 1), (b, 0), and (1, b), and the (x, y) coordinates of the sample points for a neighboring pixel are related according to (0, b), (a, 0), (b, 1), and (1, a).

3. The system according to claim 2, wherein the sum "a+b" is equal to 1.

4. The system according to claim 2, wherein a=⅓ and b=⅔.

5. A method for creating a sampling pattern covering an array of pixels for use in an anti-aliasing system, the method comprising:
    providing each pixel with a pattern of sample points at the edges of the pixel; and
    defining the sample point pattern of each pixel so that it is a mirror image of a directly neighboring pixel, mirrored in a mirror plane, and different from the sample point pattern of said directly neighboring pixel, wherein the mirror planes are located on the edges of the pixel, and the pattern has one sample point per pixel edge, and displaying pixel values derived from said sample points on a screen.

6. The method according to claim 5, wherein the (x, y) coordinates of the sample points for a pixel are related according to (0, a), (a, 1), (b, 0), and (1, b), and the (x, y) coordinates of the sample points for a neighboring pixel are related according to (0, b), (a, 0), (b, 1), and (1, a).

7. The method according to claim 6, wherein the sum "a+b" is equal to 1.

8. The method according to claim 6, wherein a=⅓ and b=⅔.

9. A system for generating anti-aliased images, comprising:
    a processor configured to generate an anti-aliased image created by a sampling pattern covering an array of pixels for use in the anti-aliasing system, where each pixel has a pattern of sample points at the edges of the pixel, and defining the sample point pattern of each pixel so that it is a mirror image of a directly neighboring pixel, mirrored in a mirror plane, and different from the sample point pattern of said directly neighboring pixel, wherein the mirror planes are located on the edges of the pixel, and the pattern has one sample point per pixel edge, wherein pixel values derived from said sample points are displayed on a screen.

10. An anti-aliasing system comprising a GPU, wherein the GPU is adapted to define a pattern of sample points at the edges of a pixel, wherein the GPU is adapted to define the sample point pattern of each pixel so that it is a mirror image of a directly neighboring pixel, mirrored in a mirror plane, and different from the pattern of said directly neighboring pixel, wherein the mirror planes are located on the edges of the pixel, and the pattern has one sample point per pixel edge, wherein pixel values derived from said sample points are displayed on a screen, and wherein the GPU is implemented in hardware.

11. The system according to claim 10, wherein the (x, y) coordinates of the sample points for a pixel are related according to (0, a), (a, 1), (b, 0), and (1, b), and the (x, y) coordinates of the sample points for a neighboring pixel are related according to (0, b), (a, 0), (b, 1), and (1, a).

12. The system according to claim 11, wherein the sum "a+b" is equal to 1.

13. The system according to claim 11, wherein a=⅓ and b=⅔.

14. A computer-readable medium storing computer executable instructions associated with a CPU, said CPU being operatively coupled to a GPU for defining a pattern of sample points at the edges of a pixel, the instructions when executed by the CPU:
    defining the sample point pattern of each pixel so that it is a mirror image of a directly neighboring pixel, mirrored in a mirror plane, and different from the sample point pattern of said directly neighboring pixel, wherein the mirror planes are located on the edges of the pixel, and the pattern has one sample point per pixel edge; and
    displaying pixel values derived from said sample points on a screen.

15. The system according to claim 1, wherein the pattern has one and only one sample point per pixel mirror plane.

16. The system according to claim 2, wherein a=⅔ and b=⅓.

17. The method according to claim 5, wherein the pattern has one and only one sample point per pixel mirror plane.

18. The method according to claim 6, wherein a=⅔ and b=⅓.

19. The system according to claim 11, wherein a=⅔ and b=⅓.

20. A computer-readable medium storing computer executable instructions, which when executed by a GPU define a pattern of sample points at the edges of a pixel, the medium comprising instructions for:
    defining the sample point pattern of each pixel so that it is a mirror image of a directly neighboring pixel, mirrored in a mirror plane, and different from the pattern of said directly neighboring pixel;
    locating the mirror planes on the edges of the pixel, and the pattern has one sample point per pixel edge; and
    displaying on a screen pixel values derived from said sample points, wherein the GPU is implemented in software.

21. The medium of claim 20, wherein the (x, y) coordinates of the sample points for a pixel are related according to (0, a), (a, 1), (b, 0), and (1, b), and the (x, y) coordinates of the sample points for a neighboring pixel are related according to (0, b), (a, 0), (b, 1), and (1, a).

22. The medium of claim 20, wherein the sum "a+b" is equal to 1.

23. The medium of claim 20, wherein a=⅓ and b=⅔.

* * * * *

UNITED STATES PATENT AND TRADEMARK OFFICE
CERTIFICATE OF CORRECTION

PATENT NO. : 7,495,672 B2  Page 1 of 1
APPLICATION NO. : 10/539813
DATED : February 24, 2009
INVENTOR(S) : Akenine-Moller et al.

It is certified that error appears in the above-identified patent and that said Letters Patent is hereby corrected as shown below:

In Column 1, Line 54, delete "GeForce3graphics" and insert -- GeForce3 graphics --, therefor.

In Column 2, Line 46, after "invention" insert -- , --.

In Column 2, Line 49, after "invention," delete "and".

In Column 2, Line 52, delete "scheme." and insert -- scheme, and --, therefor.

In Column 3, Line 25, delete "memory-207" and insert -- memory 207 --, therefor.

In Column 3, Line 37, delete "individual-pixels" and insert -- individual pixels --, therefor.

In Column 4, Line 22, delete "mirroring-the" and insert -- mirroring the --, therefor.

In Column 4, Lines 50-51, delete "contains-four" and insert -- contains four --, therefor.

In Column 5, Line 46, delete "or-the" and insert -- or the --, therefor.

In Column 6, Line 32, delete "the-triangle." and insert -- the triangle. --, therefor.

Signed and Sealed this

Twenty-seventh Day of October, 2009

David J. Kappos
*Director of the United States Patent and Trademark Office*